3,674,611
Patented July 4, 1972

3,674,611
DECORATIVE SURFACE COVERINGS
Robert K. Petry, Morris Plains, and Harry A. Shortway, Glen Rock, N.J., assignors to Congoleum Industries, Inc., Kearny, N.J.
Filed Apr. 10, 1970, Ser. No. 27,374
Int. Cl. B32b 5/14, 5/16, 5/18
U.S. Cl. 161—63                                                                 23 Claims

ABSTRACT OF THE DISCLOSURE

A resinous surface covering having on the surface thereof a plurality of raised cellular areas and a plurality of non-elevated areas adjacent to said raised areas, the non-elevated areas having flocked textile fibers adhesively embedded therein; the height differential between the elevated and non-elevated areas being achieved by either a mechanical or chemical embossing technique.

BACKGROUND OF THE INVENTION

Figure 1:
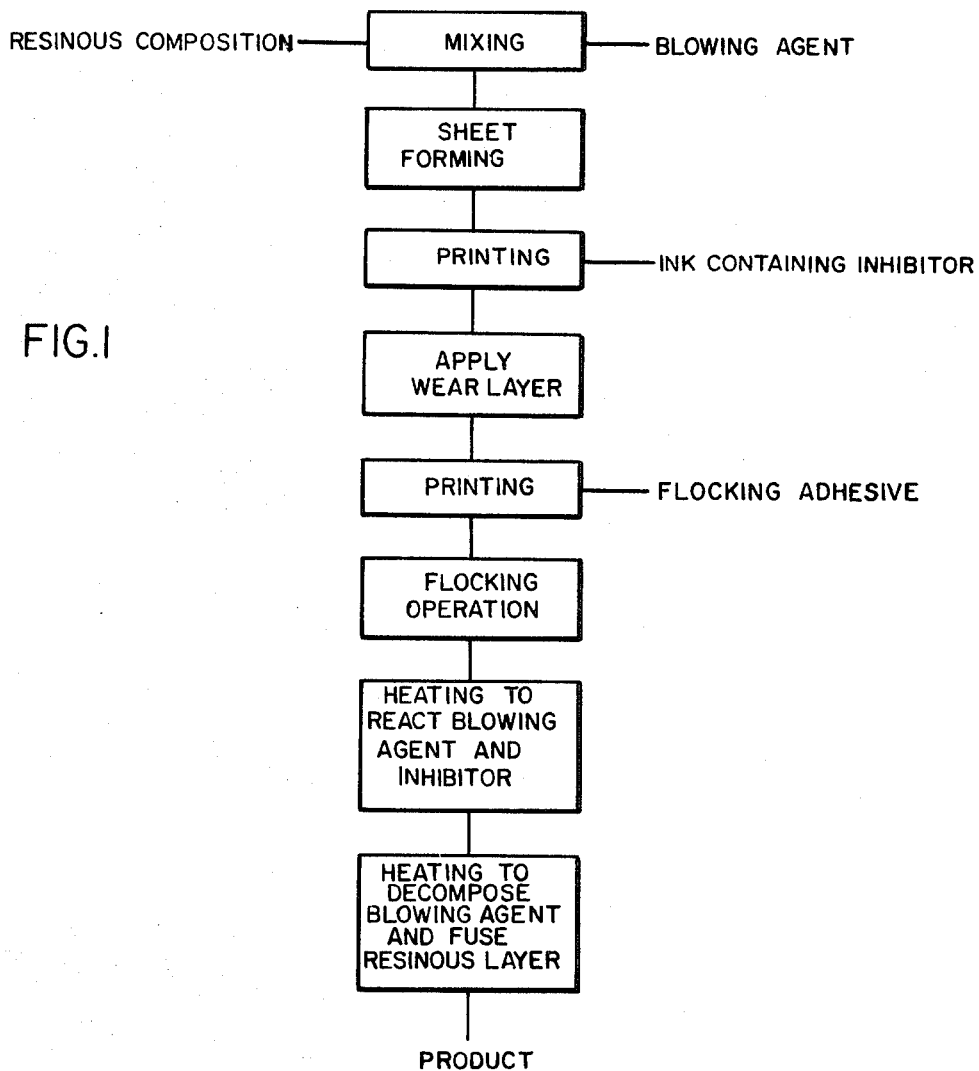

Sheets of resinous composition have found widespread use as decorative and wear-resistant coverings for a wide range of products. Such sheets, for example, are used extensively as wall, floor and table coverings, book covers, decorative containers, as fabrics for use as upholstery, clothing and automobile interiors, and the like. In many instances, the resinous composition sheets are applied or formed on backings such as woven fabrics, paper, felt, metal, wood, glass, and the like. These backing materials have many purposes, the most common being added strength and serviceability. It is common practice to emboss the surface of such sheets to give added decorative appeal and, in many instances, further utility. Typical of the types of embossings are those which stimulate leather or textured cloth, such as linen. In some instances, the embossed areas are filled in with pigmented ink by techniques known as "spanishing" or "valley printing." Designs have also been printed on the surface of resinous composition sheets and, in many instances, the designs have been protected by the application of a transparent or translucent overcoating.

The introduction of cellular resinous compositions has led to their incorporation in products such as recited above, either alone, or in combination with non-cellular resinous composition surface wear layers and/or backing webs. The cellular foam sheet gives the product various desirable properties, depending on the type of cellular foam, such as a high resiliency and good feed or "hand."

A major source of competition for smooth surface floor coverings is from woven or tufted soft surface carpeting. Carpeting is not only soft and comfortable under foot, but also has a three-dimensional textured appearance which is particularly attractive. Products which incorporate the desirable characteristics of both soft and smooth surface coverings have been produced. For example, a product has been produced by printing a design on a textured backing, such as embossed flooring felt, with a thermoplastic resinous composition containing a foaming agent and thereafter heating the printed design to fuse the resinous composition and foam the thermoplastic composition. The resulting product closely simulates woven or tufted carpet having a three-dimensional surface caused by the embossing and a resilient character caused by the foam as well as a unitary easily cleaned surface. In view of these advantages, products of the latter description are a desired commodity.

SUMMARY OF THE INVENTION

It is the primary object of this invention to produce a novel surface covering which contains both smooth surface areas and textile fiber areas.

It is a further object of the invention to produce a surface covering wherein the smooth sections exhibit good resiliency and feel and the fibrous sections are firmly embedded in the resinous base while being present in register with a predetermined design.

Other objects and advantages of the invention will be apparent from the descrpition that follows hereinafter.

In accordance with the invention, it has now been discovered that it is possible to produce surface coverings which contain both smooth surface areas and fibrous areas by utilizing combinations of embossing and flocking techniques in the preparation thereof, the embossing and flocking techniques being performed in several possible sequences. Thus, a foamed resinous base is provided with an embossed surface by being subjected to either a mechanical or chemical embossing technique. The areas which are not depressed by the embossing procedure represent the smooth areas of the resulting products. The other areas, i.e. the areas which will represent the depressed areas in the final product, are subjected to a flocking operation wherein short textile fibers are embedded in the resinous base by means of a flocking adhesive. The resulting products thus contain a plurality of smooth, resilient areas adjacent to a plurality of soft, fibrous areas.

There are a number of advantages inherent in the products of this invention. For example, they can be prepared in a wide variety of highly decorative designs. The fibers can be flocked in any desired design, whether such design be predetermined or random. The embossed areas and the flocked areas will generally be in exact register. The flocked areas can constitute a major or minor portion of the total surface area. The top of the flocked pile can be level with, below or above the level of the smooth surface areas depending upon the depth of embossing and the length of the individual fibers. The flocked areas are more durable and permanent as a result of being embedded below the surface of the resinous base and shielded from the normal wear and tear which the surface is subjected to.

The products of this invention can be utilized in a virtually unlimited number of applications and particularly as decorative, resilient and wear-resistant coverings for a wide range of products. Thus, they can be used as floor, wall and ceiling coverings, book covers, decorative containers, as fabrics for use as upholstery, clothing and automobile interiors, and the like.

Figure 2:
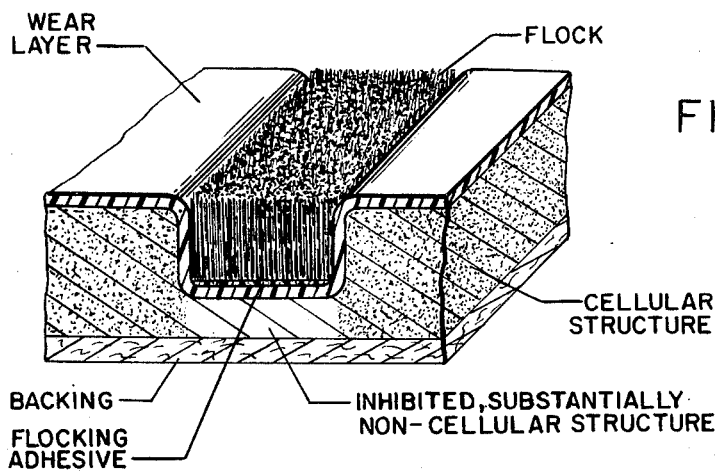

Our invention will be better understood from the following detailed description thereof together with the accompanying self-explanatory drawings in which:

FIG. 1 is a flow diagram of a typical embodiment of the process utilized in this invention; and FIG. 2 is an enlarged cross-sectional view of a typical product.

DESCRIPTION OF THE PREFERRED EMBODIMENTS

In accordance with the invention, a foamable resinous polymer composition is applied to a base. The resinous binder is preferably one that can be formed into a continuous film exhibiting a good printing surface without decomposition of the blowing agent, and thereafter expanded by exposure to the appropriate temperature range. In this specification and claims, the term "gelled" is intended to mean that state which is achieved in a resinous composition during the transition from a random dispersion or suspension of discrete resin particles in plasticizer to one of a homogeneous consistency and uniform viscosity and rheological characteristics.

The foamable composition is also preferably a dispersion of resin in a liquid medium. The dispersion medium can be water in the case of an aqueous latex, organic solvent as an organosol or plasticizer as a plastisol. Best results have been obtained with a dispersion of resin in a plasticizer which is conventionally termed a plastisol. A plastisol has appreciable fluidity at normal room temperature, but is converted by heat into a fused, flexible, tough thermoplastic mass. Plastisols are preferrd since it is unnecessary to remove large volumes of carrier as is necessary with a latex or organosol. The composition can also be a mixture of dry blend and blowing agent. The dry blend is resin particles having plasticizer absorbed on their surface. The dry blend with the addition of stabilizer, pigments and the like can be mixed with the blowing agent and distributed on a base in a smooth layer. The layer is then heated to either form a porous sheet or to fuse partially or completely the composition into a solid sheet.

The preferred and most widely used resin for surface coverings are polymers of vinyl chloride. The vinyl chloride polymers can either be simple, unmixed homopolymers of vinyl chloride or copolymers, terpolymers or the like thereof in which the essential polymeric structure of polyvinyl chloride is interspersed at invervals with the residues of other ethylenically unsaturated compounds polymerized therewith. The essential properties of the polymeric structure of polyvinyl chloride will be retained if not more than about 40 percent of the extraneous comonomer is copolymerized therein. Suitable extraneous comonomers include, for instance, vinyl bromide, vinyl fluoride, vinyl esters such as vinyl acetate, vinyl chloroacetate, vinyl butyrate, other fatty acid vinyl esters, vinyl alkyl sulfonates, and the like; vinyl ethers such as vinyl ethyl ether, vinyl isopropyl ether, vinyl chloroethyl ether and the like; cyclic unsaturated compounds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate and the like; vinylidene compounds such as vinylidene chloride, vinylidene bromide, vinylidene fluorochloride and the like; unsaturated hydrocarbons such as ethylene propylene, isobutene and the like; allyl compounds such as allyl acetate, allyl chloride, allyl ethyl ether and the like, and conjugated and cross-conjugated ethylenically unsaturated compounds such as butadiene, isoprene, chloroprene, 2,3-dimethylbutadiene-1,3-piperylene, divinyl ketone and the like. Although such vinyl chloride resins are preferred, as is apparent, the compositions can be formed from any resin which can be foamed with a blowing agent and the invention is not intended to be limited to any particular resin or group since many other types and groups of resins will occur to those skilled in the art and the particular resin selected does not form part of the invention. Other resins which can be mentioned, however, are polyethylene; polypropylene; methacrylates; synthetic rubber, such as neoprene, silicone, SBR and nitrile; polyurethanes; polyamides; polystyrene; phenolics; urea-formaldehydes; cellulose esters; epoxies and silicones.

In the formulaiton of plastisol compositions for use in the invention, the fine particle size resin is uniformly dispersed in a mass of fluid plasticizer. The fluidity of plastisols is influenced in part by the particular resin and plasticizers selected, but is also a function of the ratio of plasticizer to resin. Plastisols become less fluid as the ratio of plasticizer to resin is reduced. Coating compositions for use in the invention preferably contain from about 35 to about 150 parts plasticizer per 100 parts resin with a range of about 50 to about 80 parts plasticizer per 100 parts resin being particularly effective. The viscosity of plastisol compositions can also be reduced by the addition of small amounts of a volatile diluent not exceeding about 10 parts per 100 parts resin; it being required that the diluent have no solvating effect on the resin. Useful diluents include benzene, toluene, methyl ethyl ketone, petroleum solvents such as V.M. and P. naphtha (boiling range of 190–275° F.) and the like.

Organosols for use in the invention preferably contain about 20 to about 55 parts of plasticizer per 100 parts of resin with about 30 to 40 parts of plasticizer per 100 parts of resin being particularly preferred, whereas plastisols usually contain about 35 to about 150 parts of plasticizer per 100 parts of resin. The amount of solvent utilized depends in large measure on the coating viscosity best suited for the coating apparatus utilized.

The selection of the plasticizer is important in determining the strength and flexibility of the coating and also in influencing the viscosity and viscosity stability of the composition and the foaming characteristics of the foamable composition. Esters of straight and branched chain alcohols with aliphatic acids impart low viscosity and good viscosity stability. Typical plasticizers of this type include dibutyl sebacate, dioctyl sebacate, dioctyl adipate, didecyl adipate, dioctyl azelate, triethylene glycol di(2-ethylhexanoate), diethylene glycol dipelargonate, triethylene glycol dicaprylate, 2,2,4-trimethyl-1,3-pentanediol diisobutyrate, and the like. Plasticizers of the aromatic type, such as esters of aliphatic alcohols and aromatic acids or aromatic alcohols and adiphatic acids or aromatic alcohols and aromatic acids may also be utilized, although the use of highly aromatic placticizers is limited by their tendency to yield plastisols of high viscosity. Typical plasticizers of this type include dibutyl phthalate, dicarpryl phthalate, dioctyl phthalate, dibutoxy ethyl phthalate, dipropylene glycol dibenzoate, butyl benzyl sebacate, butyl benzyl phthalate, dibenzyl sebacate, dibenzyl phthalate and the like. Other types of plasticizers, such as esters of inorganic acids, including tricresyl phosphate, octyl diphenyl phosphate and the like, alkyd derivatives of rosin chlorinated paraffin, high molecular weight hydrocarbon condensates and the like can also be used. The plasticizer or blend of plasticizers is chosen to yield a composition of the desired viscosity and/or foaming characteristics. In addition, the plasticizer should preferably have a low vapor pressure at the temperatures required to fuse the resin. A vapor pressure of two millimeters of mercury or less at 400° F. has been found particularly satisfactory.

Small amounts of stabilizers, well known in the art of making polyvinyl chloride compositions, are incorporated in the vinyl resin composition to mnimize the effects of degeneration by light and heat. Primary stabilizers ordinarily used are metallo-organic compounds, salts or complexes containing a metal component such as cadmium, zinc, lead, tin, barium or calcium combined with an anion constituent such as octaoate, 2-ethylhexoate, naphthenate, tallate, benzoate, oxide, acetate, stearate, phenate, laurate, caprylate, phosphite, phthalate, maleate, fumarate, carbonate, sulfate, silicate, alkyl mercaptide, or mercaptoacid salts and esters. Mixtures containing one or metals and/or one or more anion components are commonly employed. Depending upon the degree of heat and light stability required, secondary or auxiliary stabilizers such as epoxidized components, organic phosphites and phosphates, polyhydric alcohols, ultra violet light absorbers, optical brighteners, nitrogen compounds and antioxidants may also be incorporated in the resinous composition.

The backing web utilized will depend in large measure on the product to be produced. If the backing web is to remain as part of the finished product, then it can be formed of a resinous composition, felted sheet, woven or knitted fabric or the like. Any of the thermoplastic or elastomerc resins compositions which can be formed into a sheet can be used to form backing sheets for use in the invention. Typical of the resins which can be compounded with plasticizers and fillers and sheeted to form a sheet are such resins as butadiene-styrene copolymers, polymerized chloroprene, polyvinyl chloride, polyvinyl acetate, vinyl chloride-vinyl acetate copolymers and the like. In some cases, scrap and degraded resinous compositions can be salvaged by forming them into sheets which can be used as backing sheets in producing products in accordance with the invention.

As indicated, suitable backing sheets also include woven fabrics formed of such fibers as cotton, wool, asbestos, glass and various synthetic fibers. Where loosely woven fabrics such as burlap are used, the fabric can be sized to prevent passage of the coating composition through the openings between the fibers by utilizing the conventional sizing composition used in the textile industry or a very viscous application of the coating composition which is to be applied. The coating can be dried or hardened quickly before it passes through the fabric.

Felted cellulose or mineral fibrous sheets are particularly useful in accordance with the invention for producing products for use as surface coverings since they are low in cost and yet are flexible and strong. The sources of cellulose can include cotton or other rags, wood pulp, paper boxes, or mixtures thereof in any proportion. Asbestos is the most commonly used mineral fiber. In addition, water resistant and strengthening impregnants as well as size coats may be utilized to improve the quality and performance of the backing web.

Blowing agents are well known in the art and the particular blowing agent selected usually depends on such matters as cost, resin and density desired. While many compounds decompose by giving off a gas, only a relatively few are produced commercially in quantity. Complex organic compounds which, when heated, decompose to yield a inert gas and have residues which are compatible with the resin are preferred as blowing agents. Such materials have the property of decomposition over a narrow temperature range which is particularly desirable to obtain a good foam structure.

Typical types of blowing agent which can be mentioned include substituted nitroso compounds $$\left(\begin{array}{c} R-N-R' \\ | \\ NO \end{array}\right)$$

substituted hydrazides (RSO$_2$NHNR'), substituted azo compounds (R—N=N—R'), acid azides (R—CON$_3$), guanyl compounds $$\left(\begin{array}{c} NH=C-NH_2 \\ | \\ R \end{array}\right)$$

and the like wherein R and R' are hydrogen or hydrocarbon groups usually containing from one to ten carbon atoms.

The blowing agents which have found the most widespread use are those compounds having the >N—N< or —N=N— linkages which decompose at elevated temperatures to yield an inert gas high in nitrogen. These compounds have the general formula $$\begin{array}{c} b \qquad d \\ \diagdown \diagup \\ N-N \\ \diagup \diagdown \\ a \qquad c \end{array} \quad \text{and} \quad a-N=N-b$$

wherein $a$, $b$, $c$, and $d$ are hydrocarbon groups preferably containing up to ten carbon atoms, or hydrogen with at least one of the groups being a hydrocarbon group. Many of these hydrocarbon groups contain additional nitrogen groups such as hydrazide, amido, nitro, nitrile and the like.

Typical blowing agents with their decomposition temperature ranges are shown in Table 1:

TABLE 1

| Blowing agent | Decomposition temperature, °F. |
|---|---|
| Azodicarbonamide (NH$_2$CN=N—C—NH$_2$) 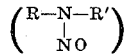 | 325–400 |
| p,p'-Oxybis (benzene sulfonyl hydrazide) | 300–340 |
| p,p'-Oxybis (benzene sulfonyl semicarbazide) | 390–425 |
| Azobisisobutyronitrile | 215–250 |
| N,N'-dimethyl-N,N'-dinitrosoterephthalamide | 190–220 |
| Diazoaminobenzene | 212–266 |

Additional blowing agents which can be mentioned are N,N'-dinitrosopentamethylenetetramine, aminoguanidine bicarbonate, p,p'-thiobis (benzene sulphonhydrazide), p,p'-diphenylmethane disulphonhydrazide, benzene m-disulphonhydrazide, benzene sulphonhydrazide, terephthalazide, benzazide, p-tert-butyl benzazide, phthalazide, isophthalazide, 1,3-diphenyltriazene, azohexahydrobenzonitrile, azo dicarboxylic acid diethyl ester, naphthalene-1,5-disulfonyl hydrazide and biuret.

Blowing agents for use in the invention must be decomposed an effective amount at a temperature below the decomposition temperature of the resin used. The preferred blowing agents are those that decompose above the elastomeric point of the resin composition since this enables at least partial gelling of the foamable coating so that a design can readily be printed on its surface. Such blowing agent usually decomposes above 200° F. As an illustration, with the preferred vinyl chloride polymers, a blowing agent decomposing between about 300° F. and about 450° F. can be used. The minimum initial decomposition temperature must be sufficiently high to prevent premature gas evolution occurring during processing. In some instances, a combination of blowing agents can be used to advantage.

It is a common practice to add accelerators or catalysts to the composition to accelerate the decomposition of the blowing agents, reduce the decomposition temperature and/or narrow the decomposition temperature range. Common accelerators are various metal salts including lead, zinc, cadmium, barium, calcium, nickel, aluminum, magnesium and tin salts. These agents can also serve as stabilizers for the composition. In the specification and claims, the term "blowing agent" is intended to include not only the blowing agent itself, but also the combination of a blowing agent with an accelerator.

The foamable composition is formed into a film of the desired thickness and then heated to gel the composition to give a good printing surface for the application of the flocking adhesive. In this specification and claims, the term "gell" includes both the partial (at least the elastomeric point) and complete solvation of the resin or resins with the plasticizer (fused). The heating is limited as to the time and temperature to prevent the decomposition of the blowing agent in the composition. When using the preferred polyvinyl chloride composition, the temperature of the composition is preferably raised to about 240° F. to about 275° F. Generally, the actual oven temperature would be a slightly higher temperature to have the composition reach the desired temperature. If the foamable composition is to be formed into a self-supporting film, then the temperature would conventionally be high enough to fuse the composition.

The degree of foaming of a typical plastisol formulation using different concentrations of blowing agent is shown in Table 2:

TABLE 2

| Parts azodicarbonamide per 100 parts resin | Ratio of foam thickness to original thickness | Density (lbs. per cu. ft.) |
|---|---|---|
| 0.0 | 1/1 | 80 |
| 0.1 | 1.33/1 | 60 |
| 0.5 | 2/1 | 40 |
| 1.0 | 3/1 | 27 |
| 2.0 | 4.5/1 | 17.5 |
| 3.0 | 6.5/1 | 12.3 |
| 5.0 | 9.3/1 | 8.6 |

It has been found that density of from about 10 to 30 pounds per cubic foot produces the most useful products.

Table 3 gives the preferred temperature and time relationship using the preferred polyvinyl chloride resin:

TABLE 3

| Film condition [1] | Resin temperature (° F.) | Oven temperature (° F.) circulating air | Exposure time (seconds) |
| --- | --- | --- | --- |
| Elastomeric point | 240–300 | 250–400 | 10–200 |
| Fused | 340–375 | 350–450 | 60–240 |
| Blown | 340–400 | 350–450 | 60–240 |

[1] 0.014 inch plastisol on 0.25 inch cellulosic felt base impregnated with 9 percent vinyl acetate and 30 petroleum hydrocarbon. The sample was supported on a wire screen in the oven.

The time required to reach the elastomeric point will depend in part on the film thickness and particular base as shown in Table 4:

TABLE 4

| | Film thickness (inch) | Time/temperature (seconds/° F.) |
| --- | --- | --- |
| Base: | | |
| A [1] | 0.008 | 45/300 |
| A [1] | 0.014 | 69/300 |
| B [2] | 0.014 | 90/300 |

[1] A cellulosic felt of 0.025 inch thickness impregnated with 25 percent vinyl acetate homopolymer.
[2] A cellulosic felt of 0.043 inch thickness containing 5 percent of a cured ureaformaldehyde resin and 25 percent of butadiene-acrylonitrile polymer.

While the foamable composition is described as being applied as a coating to the base, it is apparent that this composition can also be applied as a preformed sheet or the composition can be molded, extruded, calendered or otherwise formed into any desired shape depending on the ultimate use of the product.

All mechanical and chemical embossing techniques known to those skilled in the art are available for use in preparing the novel products of this invention. Mechanical embossing of resinous composition sheets is conventionally accomplished with an embossing roll or plate which has been engraved or otherwise treated to create the design desired in raised relief on its surface. The sheet and/or embossing surface is heated and the design pressed into the heat-softened sheet.

Another embossing procedure which is mechanical in nature is disclosed in U.S. Pat. 2,943,949 which issued to Robert K. Petry on June 5, 1960. In this patent, a web is embossed with a design, a resinous layer containing a blowing agent is applied to the surface of the embossed web to form a relatively smooth layer and then the foamable composition is heated to decompose the blowing agent and fuse the composition. Since a greater thickness of foamable composition is present in the areas over the depressions in the web, the surface of the sheet is raised at these points to give a reverse image of the embossings.

A typical chemical embossing technique is disclosed in U.S. Pat. 2,961,332 which issued to R. Frank Nairn on Nov. 22, 1960. In accordance with this patent, a layer of foamable resinous composition is formed on a base by printing a number of different resinous compositions each containing its own amount or type of blowing agent. The layer is then heated to decompose the blowing agent and fuse the composition. The product has an irregular or textured surface conforming to the amount or type of blowing agent in the various printed compositions. Another method is disclosed in U.S. Pat. 2,964,799 which issued to P.E. Roggi et al., on Dec. 20, 1960. According to this patent, a foamable resinous composition is formed into a self-supporting sheet of fused composition. Heat is then applied to the foamable composition sheet at various points to cause the blowing agent at those points to decompose and form a cellular structure. The raised areas in the finished sheet correspond to the points of heat application. U.S. Pat. 2,825,282 which issued to J. B. Gergen et al., on Mar. 4, 1958, discloses a related method. In accordance with this latter patent, a foamable composition is formed into a sheet and then printed with inks containing radiant energy-absorbing pigments. On exposure of the sheet to radiant energy, the blowing agent in contact with the pigments receives more intense heat and, therefore, will decompose and form cellular foam without affecting the unprinted portions of the sheet.

An additional embossing technique is disclosed in U.S. Pats. 3,293,094 and 3,293,108, issued to R. Frank Nairn et al. on Dec. 30, 1966. In this procedure, the decomposition temperature of a chemical blowing agent is controlled by applying an inhibitor to the surface of the composition. The subsequent application of heat to the composition selectively decomposes the blowing agent, thereby resulting in the formation of either depressed or raised areas in the final product at the points of inhibitor application.

The inhibitor for the blowing agent is applied to one surface of the resinous polymer composition in any desired design. The inhibitor is preferably applied in a liquid carrier which allows better control of the concentration of inhibitor applied. If the inhibitor is not soluble in the carrier, it can be dispersed with the carrier in the conventional paint-making technique to produce a fine dispersion. One of the easiest methods of applying the inhibitor-containing composition is by utilizing any of the conventional printing techniques such as silk screen, offset or direct rotogravure printing. As previously indicated, the inhibitor composition can be transparent or pigmented. It is conveniently formulated in the manner of a printing ink. Such compositions usually contain a carrier for the pigment, such as a vinyl resin, and, in some cases, a plasticizer for the resin to give good adhesion to the printing surface. The inhibitor for the blowing agent is an agent which alters the decomposition temperature of the blowing agent in the area of the foamable composition where it is deposited. By varying the concentration of the inhibitor, the thickness of its application or its pentration (solubility or diffusibility) rate into the foamable composition, the degree of suppression of the decomposition of the blowing agent can be controlled to produce foam layers of various heights or thicknesses.

The choice of an inhibitor for the blowing agent will depend on a number of factors. The most important are the particular blowing agent utilized in the system, the stabilizer and plasticizer in the composition and the fusion and decomposition temperature of the resin. As a general rule, it is desired to have at least 20° F. difference between the temperature at which the blowing agent will decompose and that at which the inhibited blowing agent will decompose. If a blowing agent is utilized that decomposes below the gel temperature of the composition, the inhibitor can be applied to the base and then the foamable composition applied over the inhibitor. Alternatively, the inhibitor can be applied to the surface of the viscous foamable coating prior to heating.

The chemical composition of blowing agents varies widely and, therefore, the type of compound utilized as an inhibitor will vary. Compounds which have been found to be effective as inhibitors to alter the decompostion temperatures for blowing agents which contains the —N=N— or >N—N< linkages are the following groups: organic acids, organic acid halides, organic acid anhydrides, polyhydroxy alcohols, carbohydrates, amines, amides, oximes, mercaptans, sulfides, sulfones, sulfoxides, sulfonic acids, sulfonyl halides, sulfonamides, sulfimides, isocyanates, polyketones, polyaldehydes, phosphates and phosphites.

The amount of material utilized in the ink will determine in large measure the degree of foam inhibition. Particularly good results have been obtained with from 5 to about 75 percent of the inhibitor. The inhibiting action of some of the agents is greatly increased if a resinous coating is placed over the inhibitor prior to decomposition of the blowing agent. Apparently, the coating prevents the evaporation or decomposition of the inhibitor by the high heat.

The flocking operation which is utilized in preparing our novel products initially involves applying a flocking adhesive to the surface of the foamed composition. In applying the adhesive, it is essential that its areas of application correspond exactly with either the depressed areas of the resinous composition or with the surface areas that will be depressed during the subsequent embossing operation. Thus, for example, where the embossed effect is achieved by application of an inhibitor, the adhesive will be applied over the same areas as the inhibitor-containing printing composition. Printing techniques such as silk screen, offset or direct rotogravure printing are particularly desirable for this type of application. In this manner, the flocking in the final product is in exact register with the embossed areas and is embedded below the plane of the base to insure greater durability and permanence.

All flocking adhesives which known to those skilled in the art may be utilized in the flocking operation. Included among such adhesives are: acrylic latex, vinyl latex, elastomer solution and plastisol adhesives. The following examples represent typical flocking adhesive formulations:

| Acrylic latex adhesive: | Parts by weight |
|---|---|
| Self-crosslinking acrylic latex | 100 |
| Thickening agent | 2 |
| Catalyst | 1 |
| Vinyl latex adhesive: | |
| Polyvinyl chloride latex | 100 |
| Thermosetting resin | 17 |
| Thickener | 4 |
| Elastomer solution adhesive: | |
| Fully reacted polyurethane solution | 10–20 |
| Solvent | 90–80 |
| Plastisol adhesive: | |
| Polyvinyl chloride resin | 100 |
| Plasticizer | 60–100 |
| Stabilizer | 1–5 |
| Thickener | 0–3 |

The thickness in which the adhesive is applied depends, to a great extent, on the flock length. Table 5 gives the preferred adhesive thickness and flock length relationship which will insure adequate adhesion.

TABLE 5

| Adhesive thickness (inches): | Flock length (inches) |
|---|---|
| 0.002–0.005 | 0.020 (0.5 mm.) |
| 0.005–0.010 | 0.040 (1.0 mm.) |
| 0.010–0.015 | 0.080 (2.0 mm.) |
| 0.015–0.025 | 0.120 (3.0 mm.) |
| 0.025–0.040 | 0.160 (4.0 mm.) |

"Flock" is defined as short fibrous particles. The fibers may be prepared from such natural materials as wool, linen and cotton as well as from synthetic materials such as viscose rayon, cellulose acetates, polyesters, polyamides, polyethylene, polypropylene, vinyl polymers, and acrylonitrile polymers. The fibers can be precision cut to exact length or chopped to random length. The flock is applied to the adhesive layer by means of either a spray, a mechanical, or an electrostatic flocking technique. The spray method uses compressed air to bring the fibers into contact with the adhesive. In mechanical flocking the reverse side of the adhesive coated substrate is beaten by multi-sided bars known as beater bars. As the flock is sifted onto the adhesive coating, the vibrations set up by the beater bars fluidize the flock causing it to flow over the surface of the substrate. Initially, the fibers fall on the adhesive in random orientation. The vibration is able to stand erect those fibers that do not land flat against the adhesive. Once erect and vibrated, the fibers have an increased tendency to penetrate fully in the adhesive. As the number of erect fibers increases, the free fibers tend to align themselves with the erect cover and work down to the adhesive under the vibrating action. Thereafter the amount of oriented fibers embedded in the adhesive greatly increases and the flock density builds up rapidly.

With electrostatic flocking the lines of force of an electrostatic field are used to propel and guide the fibers in their flight from the hopper to the adhesive coated substrate. This longitudinal alignment in flight causes the fibers to impinge on the adhesive in an end-on or erect position.

The sequence of steps which may be utilized in preparing the novel products of this invention may vary although consideration should be given in making the determination to the components of the system as well as to the nature of the embossing technique to which the resinous composition will be subjected. In all instances, the procedure will be initiated by applying a layer of a first resinous composition containing a blowing agent to a base and heating the coating to at least partially gel the composition without decomposing the blowing agent.

In those instances where a mechanical embossing technique is utilized, the procedure may continue with the heating of the foamable composition in order to decompose the blowing agent and form a raised, cellular foam composition. The foamed composition is subjected to the selected mechanical embossing technique whereupon the flocking operation is initiated by the application of the flocking adhesive to the embossed areas of the composition. Flocking and heating to dry the adhesive complete this procedural sequence. On the other hand, a sequence may be used which consists of first flocking the gelled plastisol, thereafter mechanically embossing it, and finally heating it to form the raised cellular foam composition. This sequence has the advantage of not requiring the application of adhesives into the depressed areas and thereby avoiding possible contamination of the balance of the sheet.

In a chemical embossing technique, the gelled foamable composition is first selectively coated with the material that will cause the height differential on the surface of the resulting product. Thus, for example, a composition containing an inhibitor which will alter the decomposition temperature of the blowing agent is printed or otherwise applied to designated sections of the surface of the gelled composition. Thereafter, the procedure may follow the sequence which proceeds by heating to decompose the blowing agent and form the embossed surface, and, thereafter, by conducting the flocking operation in the depressed areas of the foamed composition.

As an alternative to this procedure, the flocking adhesive may be applied to those surface areas which have been coated with the embossing chemical and the flock adhered thereto prior to the decomposition of the blowing agent in the non-printed areas. The subsequent decomposition of the blowing agent results in the expansion of the non-printed areas and the corresponding imbedding of the flock in the embossed areas of the product. The application of the flock, prior to blowing, aids in the embossing operation since it acts as an insulator and thereby reduces the temperature in the non-expanding flocked areas.

As a further alternative, the embossing chemical may be incorporated in the flocking adhesive. Thus, for example, such inhibitors as trimellitic anhydride and benzotriazole are soluble in and compatible with a solution of a fully reacted polyurethane adhesive while benzotriazole and thioacetamide may be incorporated in plastisol adhesives. This procedure isures that the adhesive and embossing chemical are applied to identical sections of the surface of the foamable composition, and that the embossed and flocked areas in the final product will be in exact register.

Decomposition of the blowing agent is accomplished by heating the system to a sufficiently high temperature which also serves to fuse the resin by completely solvating the resin with the plasticizer. The temperature of the entire mass of composition upon the backing must attain the fusion temperature of the resin in order to obtain a product of maximum strength. Using the preferred vinyl resin, fusion is attained at a temperature of about 300° F. to about 375° F. In addition, the entire mass of foamable composition must be heated to a point where the blowing agent is decomposed. When the preferred high temperature blowing agent is used, foaming does not occur until the resinous composition has been fused. The heating must be carried out, however, at a temperature which allows decomposition of the blowing agent only in the areas desired.

Since the nature of the final product demands the retention of the gas that is generated in order to produce the cellular foam sections, the temperature to which the assembly is exposed and the duration of the exposure period must be selected so as to insure the latter result. Thus, the resinous material must exhibit a melt viscosity, at the selected temperature, which is sufficient to retain the evolved gas. Furthermore, heating must not be prolonged to the extent that the melt viscosity is sufficiently changed to allow the escape of the gas. Temperature considerations are also relevant to the vinyl resin, the flocking adhesive and the fibers. For example, heating should not be continued to the extent that degradation occurs in the non-flocked vinyl areas or in the adhesive itself. Excessive heating should also be avoided inasmuch as it may tend to discolor or melt the fibers.

If volatile components are used in the compositions, care must be taken that they are essentially completely removed from the film prior to fusion. This can be accomplished by heating the composition at a temperature substantially below the fusion temperature and minimum decomposition temperature of the blowing agent for sufficient time to remove the volatile material. For example, if a hydrocarbon solvent fraction (boiling point up to 350° F.) is used, heating at 200° F.–250° F. for five minutes will remove sufficient material so that fusion and blowing at 400° F. can be accomplished with good cell structure and freedom from blisters.

Heating in order to effect fusion and foaming can be brought about in a forced hot air oven; however, other types of heating can be used. For example, the product can be passed beneath radiant heating elements; alternately, dielectric heating can be used.

The foamed, fused and flocked product after leaving the heating oven is permitted to cool. Cooling is particularly important since any premature handling of the product immediately after foaming might cause partial collapse and distortion of the foam structure. Cooling can be brought about by mere exposure of the product to the atmospher; thus, the speed of motion of the backing along the processing apparatus and the spacing between the fusion oven and the end of the apparatus can be adjusted so that the product is given sufficient time to cool. Alternately, cooling can be accelerated by blowing jets of cooled air upon the fused and foamed composition, or by utilizing cooling rolls. After being cooled, the product is withdrawn from the processing apparatus.

As previously indicated, a second layer of resinous composition, i.e. a wear layer, can be applied to the product either before or after the embossing operation. The resins which may be utilized in the wear layer can be the same or different composition from the first resinous layer. If different compositions are used which are not readily compatible, an adhesive layer can be applied before the wear layer. Polymers of vinyl chloride have been found particularly effective in the formulation of the wear layer. Furthermore, the heat and light stabilizers previously described are also applicable for inclusion in the wear layer composition. The thickness of the wear layer will depend on how much wear is desired in the final product. As a general rule, a coating of from about 2 to 25 mils is sufficient to give the product good wearing qualities.

The resulting embossed products of this invention can be used in the form of a sheet as produced or can be cut into tiles or other appropriate shapes depending on the particular use to which the product is to be put. Products produced in accordance with the invention have the characteristics of excellent resilience, hand, feel and drape depending in part on the thickness of the foam layer. They are also characterized by having the flocked areas in perfect register with either a predetermined or random printed design. Still further, the products of the invention have good heat insulating properties by virtue of the layer of foamed composition and the flocked pile on the surface of the product and thus are warmer in winter than conventional resinous surface coverings.

The following examples will further illustrate the embodiment of this invention. In these examples, all parts given are by weight unless otherwise noted.

EXAMPLE I

This example illustrates the preparation of a flocked, resinous composition typical of the products of this invention.

A 0.030 inch thick asbestos sheet backing was coated, in a wet thickness of 0.020 inch, with the following foamable plastisol:

| | Parts |
|---|---|
| Polyvinyl chloride (low molecular weight) | 50 |
| Polyvinyl chloride (high molecular weight) | 50 |
| Dibasic lead phosphate | 1.5 |
| Azodicarbonamide | 2.5 |
| Titanium dioxide | 5 |
| Butyl benzoyl phthalate | 55 |
| Dodecyl benzene | 10 |

The foamable plastisol was heated to a temperature of about 300° F. for a period of three minutes in order to gel the composition and the gelled composition was then cooled.

Thereafter, the following embossing composition was applied, at a wet application thickness of 0.004 inch to designated sections of the gelled plastisol by means of a paper stencil.

| | Parts |
|---|---|
| A 15%, by weight, methyl ethyl ketone solution of a 90:10 vinyl chloride:vinylacetate copolymer | 20.0 |
| Methyl ethyl ketone | 4.0 |
| Dioctyl phthalate | 3.0 |
| A 65%, by weight, titanium dioxide paste | 8.0 |
| Trimellitic anhydride | 5.0 |

The embossing composition was air dried for fifteen minutes and the entire assembly heated to a temperature of 300° F. for a period of four minutes in order to effect penetration of the embossing composition.

The following plastisol adhesive composition was then applied, in a dry application thickness of 0.020 inch, to the identical sections of the gelled plastisol that had been coated with the embossing composition.

| | Parts |
|---|---|
| Vinyl chloride-vinyl acetate copolymer resin (dispersion grade-inherent viscosity 1.13) | 60 |
| Vinyl chloride blending resin (suspension grade-inherent viscosity 0.83) | 40 |
| Butyl benzyl phthalate | 60 |
| Epoxy tallate plasticizer | 5 |
| Calcium-zinc stabilizer | 3 |
| Pigment | 1 |

Green nylon flock, four millimeters in length, was imbedded in the adhesive by means of a beater bar technique. The flocked assembly was then heated at 400° F. for a period of 4½ minutes in order to fuse the resinous composition and decompose the blowing agent to form elevated cellular sections in the non-printed areas of the resinous layer.

The resulting product had a textured surface with the ratio of foam thickness to original thickness being approximately 3:1, the raised areas representing those sections which were not printed with the inhibitor-containing embossing composition. The nylon flock was firmly imbedded in the depressed areas of the product while the top of the flock pile extended above the level of the raised sections. The combination of the flocked areas and the smooth raised areas provided a unique and highly attractive surface covering.

EXAMPLE II

The procedure described in Example I, hereinabove, was repeated with the exception that the following embossing compositions were respectively applied to 0.020 inch, 0.030 inch and 0.040 inch thick coatings of the plastisol composition:

|  | Parts | |
|---|---|---|
|  | No. 2 | No. 3 |
| A 15%, by weight, methyl ethyl ketone solution of a 90: 10 vinyl chloride:vinyl acetate copolymer | 20.0 | 20.0 |
| Methyl ethyl ketone | 4.0 | 4.0 |
| Dioctyl phthalate | 3.0 | 3.0 |
| A 65%, by weight, titanium dioxide paste | 8.0 | 8.0 |
| 2,3-naphthalenediol | 5.0 | |
| Dichloroisocyanuric acid | | 5.0 |

In each instance, the characteristics and appearance of the resulting product were comparable to those of the product prepared in Example I. The ratio of foam thickness to original thickness in these products ranged from about 2:1 to 4:1.

EXAMPLE III

The procedure described in Example I, hereinabove, was repeated with the exception that subsequent to the application of the embossing composition, the following plastisol, wear layer composition was coated on the surface of the assembly to form a uniform clear coating of about 0.006 inch in thickness.

| | Parts |
|---|---|
| Polyvinyl chloride (specific viscosity 0.50) | 100 |
| Butyl benzyl phthalate | 34.2 |
| Dodecyl benzene | 12 |
| 2,2-dimethyl-1,4-pentanediol isobutyrate | 7 |
| Epoxidized esterified tallate | 5 |
| Stabilizer | 3 |
| Viscosity depressant | 1.26 |

The wear layer was then gelled by being heated at an oven temperature of 300° F. for a period of three minutes.

In addition to the properties described in Example I, the resulting product exhibited excellent resistance to wear, staining and chemical attack.

EXAMPLE IV

The procedure described in Example I, hereinabove, was repeated with the exception that (1) 0.5 millimeter long blue nylon flock utilized in conjunction with a 0.0025 inch adhesive thickness and (2) 1.5 millimeter long green nylon flock utilized in conjunction with a 0.01 inch adhesive thickness were, respectively substituted for the longer flock and thicker adhesive coating utilized therein, and (3) the flock was imbedded in the adhesive by means of an electrostatic technique. The properties of the resulting products were comparable to those of the product prepared in Example I with the exception that the 0.5 millimeter nylon flock did not extend above the level of the expanded sections.

EXAMPLE V

This example illustrates the use of a mechanical embossing technique in preparing the novel product of this invention.

The gelled foamable plastisol composition described in Example I, hereinabove, was heated at a temperature of 400° F. for a period of 4½ minutes in order to decompose the blowing agent and thereby form a cellular foam product. Thereafter, the sheet was cooled to a temperature of 300°–350° F. and an engraved embossing roll, maintained at a temperature below 200° F., was pressed into the heat-softened sheet in order to impart an embossed effect thereto.

The depressed areas were then coated with a 0.005 inch layer of the flocking adhesive set forth in Example I and 0.5 millimeter blue nylon flock imbedded therein by means of a spray technique. The properties of the resulting product were comparable to those of the product prepared in Example I with the exception that the nylon flock did not extend above the level of the expanded sections.

EXAMPLE VI

Designated sections of the gelled foamable plastisol composition described in Example I, hereinabove, were coated with the following flocking adhesive which, in this instance, contained the foaming inhibitor as an integral component. The adhesive was applied in a wet application thickness of 0.020 inch by means of a silk screen technique.

| | Parts |
|---|---|
| Fully reacted polyurethane resin | 25 |
| Trimellitic anhydride | 20 |
| Dimethyl formamide | 75 |
| Methyl ethyl ketone | 80 |

The flocking and blowing procedures described in Example I were then conducted on the resulting assembly.

The characteristics of the resulting product were comparable to those of the product prepared in Example I. Furthermore, the embossing and the flocked areas were in exact register. This combination of flocking and embossing provided a unique and highly attractive product.

Additional products exhibiting both smooth and flocked sections may be prepared in the manner previously described, by utilizing any of the foamable plastisol compositions and inhibitor-containing printing compositions disclosed in U.S. Pat. 3,293,108, issued Dec. 30, 1966, and said disclosure is to be deemed fully incorporated herein.

Summarizing, it is seen that this invention provides for the preparation of unique and decorative surface coverings. Variations may be made in proportions, procedures and materials without departing from the scope of this invention which is defined by the following claims.

What is claimed is:

1. A resinous assembly containing a plurality of raised cellular non-fibrous areas on the surface thereof and a plurality of fibrous areas adjacent to said raised areas; said raised areas comprising solidified, gas expanded resinous sections containing the thermal decomposition product of a gas producing blowing agent, said blowing agent being present in a resinous composition layer; and said fibrous areas comprising fibrous particles adhered by means of an adhesive layer to said resinous composition layer below the level of said raised areas.

2. The assembly of claim 1, wherein the resin in said resinous composition layer is a polymer of vinyl chloride.

3. The assembly of claim 1, wherein said blowing agent is selected from the group consisting of substituted nitroso compounds, substituted hydrazides, substituted azo compounds, acid azides and guanyl compounds.

4. The assembly of claim 3, wherein said blowing agent decomposes above about 200° F.

5. The assembly of claim 4, wherein said blowing agent is azodicarbonamide.

6. The assembly of claim 3, wherein said blowing agent contains an accelerator therefor.

7. The assembly of claim 1, wherein said adhesive layer is the dried residue of an adhesive composition selected from the group consisting of acrylic latex, vinyl latex, elastomer solution and plastisol adhesives.

8. The assembly of claim 7, wherein the thickness of said adhesive layer ranges from about 0.002 to 0.040 inch.

9. The assembly of claim 7, wherein said fibrous particles are below the level of said raised areas.

10. The assembly of claim 7, wherein said fibrous particles are level with said raised areas.

11. The assembly of claim 7, wherein said fibrous particles extend above the level of said raised areas.

12. The assembly of claim 1, which contains a backing web affixed to the underneath surface of said assembly.

13. The assembly of claim 12, wherein said backing web is asbestos sheeting.

14. The assembly of claim 1, wherein said raised cellular areas are coated with a resinous material wear layer.

15. The assembly of claim 14, wherein said resinous material in said wear layer is a polymer of vinyl chloride.

16. The assembly of claim 1, wherein a printing composition containing an inhibitor for said blowing agent and a vehicle is in contact with the resinous composition layer present in the fibrous areas and is situated between the resinous layer and the adhesive layer.

17. The assembly of claim 16, wherein said inhibitor is selected from the group consisting of organic acids, organic acid anhydrides, organic acid halides, polyhydroxy alcohols, carbohydrates, amines, amides, oximes, mercaptans, sulfides, sulfones, sulfoxides, sulfonic acids, sulfonyl halides, sulfonamides, sulfimides, isocyanates, polyketones, polyaldehydes, phosphates, and phosphites.

18. The assembly of claim 17, wherein said inhibitor is trimellitic anhydride.

19. The assembly of claim 16, wherein said printing composition contains a vinyl polymer as a carrier.

20. The assembly of claim 16, wherein said vehicle is a liquid vehicle.

21. The assembly of claim 7, wherein said adhesive composition contains an inhibitor for said blowing agent dispersed therein.

22. The assembly of claim 21, wherein said inhibitor is selected from the group consisting of organic acids, organic acid anhydrides, organic acid halides, polyhydroxy alcohols, carbohydrates, amines, amides, oximes, mercaptans, sulfides, sulfones, sulfoxides, sulfonic acids, sulfonyl halides, sulfonamides, sulfimides, isocyanates, polyketones, polyaldehydes, phosphates and phosphites.

23. The assembly of claim 22, wherein said adhesive composition is an elastomer solution comprising a fully reacted polyurethane solution and a solvent therefor, and said inhibitor is trimellitic anhydride.

References Cited

UNITED STATES PATENTS

| | | | |
|---|---|---|---|
| 3,518,154 | 6/1970 | Broadhurst | 161—64 |
| 3,257,263 | 6/1966 | Miller | 161—161 |
| 3,293,094 | 12/1966 | Nairn et al. | 161—161 |
| 3,414,928 | 12/1968 | Lemelson | 161—64 X |
| 3,454,413 | 7/1969 | Miller | 161—119 |
| 3,540,974 | 11/1970 | Broadhurst | 161—64 |

ROBERT F. BURNETT, Primary Examiner

R. O. LINKER, Jr., Assistant Examiner

U.S. Cl. X.R.

117—16; 156—79; 161—64, 119, 124, 161